United States Patent Office 3,175,996
Patented Mar. 30, 1965

3,175,996
CROSSLINKING POLYMERS CONTAINING CARBONYL GROUPS WITH ALUMINUM ALKOXIDES
Razmic S. Gregorian, Silver Spring, and Richard W. Bush, Takoma Park, Md., assignors to W. R. Grace & Co., a corporation of Connecticut
No Drawing. Filed Nov. 6, 1962, Ser. No. 235,862
17 Claims. (Cl. 260—63)

This invention relates to a novel method of crosslinking polymeric material. More particularly, this invention is concerned with crosslinking polymeric materials containing carbonyl groups by a non-radical mechanism.

Summarily, this invention comprises crosslinking polymeric materials containing carbonyl groups by subjecting the polymeric materials to the action of a crosslinking agent consisting essentially of an aluminum alkoxide or chloroaluminum alkoxide of the general formula:

$Al(OR)_{3-y}Cl_y$ wherein OR is an alkoxy group containing 1 to 8 carbon atoms, and y is equal to 0 to 1.

In the above formula for the crosslinking agent, it is to be understood that the alkoxy groups can be different, e.g., OR can be isopropoxy and butoxy in the same molecule. Additionally, it is also possible to have mixtures of the above crosslinking agents. For example, it is possible to have a catalyst consisting essentially of 50% $Al(OR)_2Cl$ and 50% $Al(OR)_3$; thus in the mixture, y is equal to 0.5.

By the term "carbonyl group" as used throughout this invention is meant a ketone or aldehyde group. The carbonyl group may comprise a part of the main polymer chain or may be present on a branch or both.

The carbonyl groups may be introduced in any of various ways, e.g., by oxidation of hydrocarbon or alcohol functions in polymer chains or alternatively, by polymerization or copolymerization of carbonyl-containing monomers. Such monomers include but are not limited to methyl vinyl ketone, acrolein, and carbon monoxide to name a few. When these monomers are copolymerized, the comonomer can be polymerizable olefin, styrene, or other monomer. No limitation is placed on the relative proportions of comonomer to carbonyl-containing monomer. However, it should be understood that crosslinking by the present invention will occur only through the carbonyl groups.

It should also be understood that this process is not necessarily confined to addition polymers. It also applies to condensation polymers containing carbonyl functions. One example of such is a condensation polymer of acetone dicarboxylic acid and hexamethylene diamine.

Olefin polymers such as polyethylene described in U.S. 2,153,553 and in U.S. 2,816,883 and polypropylene described in Belgian 543,259 are well known in the art today and are generally characterized by their organic solvent solubility and their thermoplastic properties. Lately, several methods have been tried with varying success to decrease the thermoplasticity and solubility by crosslinking the polymer. Such methods include electron impingement of the polymer and blending of free radical liberating substances into the polymer. In regard to the aforesaid latter method of polymer crosslinking the main compounds which have been utilized as crosslinking agents to date include organic peroxides and azo compounds. Such agents crosslink the polymer by a free radical mechanism. Although it is known that various organic peroxides will cause crosslinking upon admixture with polyolefins and other polymeric materials, many have been found lacking in certain regards. Thus for example, benzoyl peroxide at the necessary blending temperatures is a hazard due to its capability to decompose violently. Still other peroxides lack a sufficent half-life at the temperatures of incorporation into the molten polymer to permit uniform crosslinking therein. The azo compounds often have the drawback that, when used in sufficient quantity to obtain uniform crosslinking, the compound on decomposition gives off nitrogen which produces bubbles in the polymer. Thus there has been a long felt want for a non-radical method of crosslinking polymeric material.

The carbonyl groups in the polymeric material of the instant invention react with the crosslinking agents of the instant invention in the manner of the Meerwein-Pondorf-Verley reduction thereby affording polymer that contains aluminum crosslinks.

The advantages of the present system over crosslinking by a free radical mechanism include: (1) better control of the degree of crosslinking by controlling the number of carbonyl groups and (2) the ability to crosslink in the presence of oxygen. In free radical systems, an inert atmosphere is required as oxygen has an adverse effect on crosslinking.

The process by which oxidation of the polymeric olefin material is performed is not critical. Polyolefins can be readily oxidized by various well-known methods to give degraded polymers containing carbonyl groups. For example, polyolefins can be milled in air at a temperature in the range 160–200° C. Another method would include passing air into an oven over a polyolefin therein at a temperature of about 100–135° C. Still another method would be to suspend particles of the polyolefin in water or an organic solvent and either bubble air through the suspension or pressurize the system with air at 100–200° C. Yet another method would be to pass air at a temperature in the range of 100–200° C. through a fluidized bed of polyolefin particles. A further method would include pressing the polyolefin into film form and passing hot air at a temperature of 100–200° C. thereover.

After the polymer has been oxidized, the crosslinking reaction results in polymer-O—Al—O-polymer bonds through the reduction of the carbonyl groups in the oxidized polymer by the metal alkoxides in the manner of the Meerwein-Pondorf-Verley reaction. Since the alkoxides disclosed herein are at least bifunctional, i.e., contain at least two alkoxy groups, reaction of one molecule of the aluminum alkoxide with more than one carbonyl group will result in a crosslink. It has been found that for optimum results up to six times the amount of the aluminum alkoxide stoichiometrically required to react with the carbonyl groups present is added to obtain the greatest amount of crosslinking. Amounts in excess of the aforesaid amount fail to increase crosslinking and in many instances decrease crosslinking. This is so since statistically such an excess of aluminum alkoxide will allow for the replacement of only one alkoxy group in each aluminum alkoxide molecule by a polymeric carbonyl group. Where this happens no crosslinking will occur as it is obvious that at least two alkoxy groups in the same aluminum alkoxide molecule must be replaced by polymeric carbonyl groups in order to obtain a crosslink.

The following examples are set down to illustrate the invention and are not deemed to limit its scope.

Throughout the instant invention the melt indices (MI) were measured under the conditions specified in ASTMD 1238–52T. The densities of the polymer were measured in a density gradient tube by the Bell Laboratories Proposed ASTM Method for the Measurement of Density of Solid Plastics by the Density Gradient Technique. The percent carbonyl in the oxidized polymer was measured by infra-red on a Perkin Elmer Model 221 Spectrophotometer. In the examples, unless otherwise noted, a Brabender Plastograph Model P1–V2 equipped with a recording unit for measuring changes in torque was used both for the oxidation step and the crosslinking step. The aforesaid recording unit had a range of 0–1000 units equal to 0–1 kilogram-meter of torque. This range can be increased when necessary to 0–5000, i.e., equal to 0.5 kilogram-meter of torque by the addition of weights.

The degree of crosslinking can be measured in various ways. For example, the degree of crosslinking is related to the change in torque measured by the plastograph recorder from the time the crosslinking agent is added to the fused polymeric material until the reaction is discontinued either prematurely or because maximum torque has been achieved. The change in torque is designated as $\Delta\tau$. The greater the degree of crosslinking the greater the viscosity of the polymeric material which in turn requires a greater torque in order to drive the plastograph at a constant r.p.m. A further check of the degree of crosslinking is the change in melt index due to crosslinking to the polymeric material. Since melt index varies inversely with viscosity which varies directly with degree of crosslinking, a lower melt index after crosslinking evidences that crosslinking occurred. A still further indication of the amount of crosslinking is the reduction in the percent carbonyl after the addition of the crosslinking agent. Percent carbonyl is equal to $$\frac{\text{Gms. C=O}}{\text{Gms. polymer}} \times 100$$

Unless otherwise noted, all parts and percentages are by weight in the examples.

To show the percent reduction of carbonyl in the polymeric material after crosslinking, the addition of the crosslinking agent and the milling thereafter was performed in an inert atmosphere, i.e., nitrogen.

As will be shown hereinafter, crosslinking of polymeric material containing carbonyl groups by the present invention can be carried out in a heterogeneous two-phase system at temperatures below the melting point of the polymeric material.

Example 1

35 grams of commercial polyethylene in flake form having a melt index of 0.7 and a density of 0.96 were charged to a Brabender Plastograph and milled for 40 minutes therein while exposed to air at a temperature of 160–165° C. A sample of the thus-milled polymer on characterization had a melt index of 3.3 and on infra-red analysis contained 0.100% carbonyl. The milling head on the Brabender Plastograph was then placed under a nitrogen atmosphere and after a constant torque was recorded 0.50 gram of aluminum isopropoxide was added to the molten polymer. Milling was continued for an additional 13 minutes. $\Delta\tau$ measured as the change in torque from the time the aluminum isopropoxide crosslinking agent was added until the crosslinking reaction was discontinued was 3300 meter-grams. Gas was vented from the milling head through 2,4-dinitrophenylhydrazine solution. The solution gave a positive test for acetone. The milling head was removed and a sample of the thus-crosslinked polymer on characterization had a melt index of 0.0 and 0.013% carbonyl as obtained by infra-red analysis.

Example 2

35 grams of commercial polyethylene in flake form having a melt index of 0.7 and a density of 0.96 were charged to a Brabender Plastograph and milled under nitrogen until molten. 0.50 gram of aluminum isopropoxide was added and milling continued for 10 minutes. $\Delta\tau$, measured from the time the aluminum isopropoxide was added to the molten polymer until milling was discontinued, was 0 meter-gram. The thus-milled product on characterization had a melt index of 0.7 and contained 0.000% carbonyl as ascertained by infra-red analysis.

The above example shows the necessity of oxidizing the polymer prior to using the crosslinking agents of the instant invention. Without the necessary carbonyl sites on the polymer, the aluminum alkoxides do not perform as crosslinking agents.

Example 3

1125 grams of commercial polyethylene having a melt index of 0.7 and a density of 0.96 were milled in air in a Banbury B Mixer for 120 minutes at 160–171° C. The resulting polymer had a melt index of 1.65 and contained 0.123% carbonyl as ascertained by infra-red analysis. A 35 gram portion of the thus-milled polymer was charged under nitrogen to a Brabender Plastograph and milled under a nitrogen atmosphere until molten. 0.63 gram of aluminum isopropoxide was added to the molten polymer under nitrogen and milling was continued for 10 minutes. $\Delta\tau$ measured from the time the aluminum isopropoxide was added to the molten polymer until milling was discontinued, was equal to 4150 meter-grams. The thus-crosslinked sample on analysis had a melt index of 0.0 and a carbonyl content of 0.024%.

Example 4

100 grams of commercial polyethylene having a melt index of 0.7 and a density of 0.96 were oxidized by heating in a forced air oven for 20 hours at 127–128° C. The thus-oxidized polymer on analysis contained 0.384% carbonyl and had a melt index in excess of 10.0. A suspension consisting of 20 grams of the thus-oxidized polymer in 250 ml. of benzene was heated to reflux at 80° C. 1.0 gram of aluminum isopropoxide was added to the system and refluxing was continued for 4 hours. The benzene distillate was cooled in fractions and extracted with water. The aqueous extractions upon treatment with 2,4-dinitrophenylhydrazine solution gave a positive test for acetone. The polymer residue on characterization had a melt index of 0.06.

The presence of acetone in the distillate supports the theory that the crosslinking reaction is occurring by the mechanism of the Meerwein-Pondorf-Verley reduction as shown in the following equation:

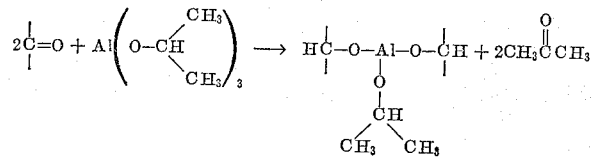

Example 5

Two pounds of commercial polyethylene in crumb form having a melt index of 0.7 and a density of 0.96 were charged to a Banbury mixer and milled for 30 minutes while open to the atmosphere at a temperature in the range of 158–165° C. 35 grams of the above oxidized polymer were charged under nitrogen to a Brabender Plastograph maintained at a temperature of 160° C. When a constant torque was recorded, a sample was removed to analyze for percent carbonyl. The percent carbonyl in the sample was 0.036%. 0.36 gram of aluminum n-butoxide was added to the molten polymer at this point, and milling was continued under nitrogen for 25 minutes at 169° C. The thus-crosslinked sample on analysis had a carbonyl content of 0.023% as obtained by infra-red analysis.

Example 6

Two pounds of commercial polyethylene in crumb form having a melt index of 0.7 and a density of 0.96 were charged to a Banbury mixer and milled therein for 2 hours at a temperature of 165° C. 35 grams of the thus-oxidized polymer was charged to a Brabender Plastograph and milled until molten under nitrogen. A sample of the thus-milled polymer had a carbonyl content of 0.138% as obtained by infra-red analysis. 1.01 grams of chloroaluminum diisopropoxide was charged to the molten polymer and milling was continued under nitrogen for one minute. $\Delta\tau$ measured from the chloroaluminum diisopropoxide crosslinking agent was added to the molten polymer until milling was discontinued was 1370 meter-grams. The cross-linked polymer product had a carbonyl content of 0.084%.

Example 7

35 grams of commercial polypropylene having a 0.90 density and a melt index of 0.8 measured at 232° C., but otherwise in accord with ASTM D1238–52T, were charged to a Brabender Plastograph and milled while exposed to air at a temperature of 215° C. for 34 minutes. The milling head on the Brabender Plastograph was then placed under a nitrogen atmosphere and 0.1 gram of aluminum isopropoxide was added to the molten polymer. Milling was continued for an additional 5 minutes at 215° C. $\Delta_T$ was 360 meter-grams.

Example 8

69 g. of styrene, 34 g. of methyl vinyl ketone and 0.5 g. of benzoyl peroxide were dissolved in 50 grams of methyl ethyl ketone and heated on a steam bath at about 80° C. for five hours. The resulting styrene-methyl vinyl ketone copolymer was precipitated by dilution with methanol, isolated and dried.

Thirty-five grams of the styrene-methyl vinyl ketone copolymer was milled until molten under nitrogen in the Brabender Plastograph at 160°, at which time a constant torque was recorded. Aluminum isopropoxide (0.5 g.) was added and milling continued for 2 minutes. $\Delta_T$ was 600 meter-grams. The vapors in the milling head were vented through a solution of 2,4-dinitrophenylhydrazine and gave a positive test for acetone.

Example 9

800 grams of commercial polyethylene having a melt index of 0.00 and a density of 0.95 were oxidized by heating in a forced air oven for 4 hours at 126–127° C. The thus oxidized polymer upon analysis contained 0.500% carbonyl and had a melt index of 1.1. 35 grams of the thus oxidized polymer were charged under nitrogen to a Brabender Plastograph and milled under a nitrogen atmosphere until molten at a temperature of 160° C. 2.0 grams of aluminum isopropoxide were added to the molten polymer and milling continued for 10 minutes. $\Delta_T$ measured from the time the aluminum isopropoxide was added to the molten polymer until milling was discontinued, was equal to 4930 meter-grams. The thus crosslinked polymer on analysis had a melt index of 0.00 and a carbonyl content of less than 0.100%.

The crosslinking step is operable at temperatures in the range 50–300° C. or more. When the crosslinking step is carried out in the melt the crosslinking temperature ranges from the melting point of the polymeric material up to 300° C. or more. When the crosslinking step is carried out in suspension in a two-phase heterogeneous system, any of various inert hydrocarbon solvents for the aluminum alkoxides can be employed at temperatures below 100° C. Such solvents include benzene, toluene, hexane, cyclohexane and other hydrocarbons.

For any given concentration of carbonyl in the polymeric material to be crosslinked, the degree of crosslinking is dependent upon the amount of aluminum alkoxide added. A mole ratio of carbonyl: aluminum alkoxide or chloroaluminum alkoxide in the range of 1:0.1 to 10 or more is operable. A preferred range is 10:5 to 3.0 respectively.

When carbonyl groups are introduced into the polymeric material by oxidation, it is preferred that oxidation stabilizers, i.e., antioxidants not be present. However, even if antioxidants are present the invention is operable, only requiring the oxidation step to be of longer duration in order to use up the antioxidant prior to forming carbonyl groups.

The crosslinked polymeric material of this invention has many and varied uses. The composition of the present invention is especially useful where polymeric material of improved clarity is required. Additional benefits obtained by crosslinking are increased dimension stability and solvent resistance at low and elevated temperatures.

This application is a continuation in part of application having Serial No. 93,871, filed March 7, 1961, now abandoned.

We claim:

1. The process of crosslinking polymeric material containing carbonyl selected from the group consisting of aldehyde and ketone carbonyl which comprises contacting the polymeric material in undissolved form at a temperature in the range from 50–300° C. with a crosslinking agent of the general formula: $Al(OR)_{3-y}Cl_y$ wherein OR is an alkoxy group containing 1 to 8 carbon atoms and $y$ is equal to 0 to 1, the amount of said crosslinking agent being in the range of 1 to 6 times the stoichiometric amount required to crosslink the polymeric material through the carbonyl groups.

2. The process according to claim 1 in which the crosslinking step is performed at a temperature ranging from the melting point of the polymeric material up to 300° C.

3. Process according to claim 1 in which the crosslinking step is performed with the polymeric material in suspension in an inert hydrocarbon solvent for the crosslinking agent at a temperature in the range 50–100° C.

4. The process of crosslinking carbonyl-containing polyethylene which has been prepared by oxidizing polyethylene to form thereon carbonyl selected from the group consisting of aldehyde and ketone carbonyl which comprises contacting the carbonyl-containing polyethylene in undissolved form at a temperature in the range from 50–300° C. with a crosslinking agent of the general formula: $Al(OR)_{3-y}Cl_y$ wherein OR is an alkoxy group containing 1 to 8 carbon atoms and $y$ is equal to 0 to 1, the amount of said crosslinking agent being in the range of 1 to 6 times the stoichiometric amount required to crosslink the polyethylene through the carbonyl groups.

5. The process according to claim 4 in which the crosslinking step is performed with the polyethylene in suspension in an inert hydrocarbon solvent for the crosslinking agent at a temperature in the range 50–100° C.

6. The process according to claim 4 wherein the crosslinking agent is aluminum isopropoxide.

7. The process of crosslinking carbonyl-containing polypropylene which has been prepared by oxidizing polypropylene to form thereon carbonyl selected from the group consisting of aldehyde and ketone carbonyl which comprises contacting the carbonyl-containing polypropylene in undissolved form at a temperature in the range from 50–300° C. with a crosslinking agent of the general formula: $Al(OR)_{3-y}Cl_y$ wherein OR is an alkoxy group containing 1 to 8 carbon atoms, and $y$ is equal to 0 to 1, the amount of said crosslinking agent being in the range of 1 to 6 times the stoichiometric amount required to crosslink the polypropylene through the carbonyl groups.

8. The process according to claim 7 wherein the crosslinking agent is aluminum isopropoxide.

9. The process of crosslinking a styrene-methyl vinyl ketone copolymer which comprises contacting the copolymer in undissolved form at a temperature in the range from 50–300° C. with a crosslinking agent of the general formula: $Al(OR)_{3-y}Cl_y$ wherein OR is an alkoxy group containing 1 to 8 carbon atoms, and $y$ is equal to 0 to 1, the amount of said crosslinking agent being in the range of 1 to 6 times the stoichiometric amount required to crosslink the copolymer through the carbonyl groups.

10. The process according to claim 9 wherein the crosslinking agent is aluminum isopropoxide.

11. A composition of matter useful in the production of crosslinked polymeric material consisting essentially of a polymeric material containing carbonyl selected from the group consisting of aldehyde and ketone carbonyl and a crosslinking agent of the general formula: $Al(OR)_{3-y}Cl_y$ wherein OR is an alkoxy group containing 1 to 8 carbon atoms, and $y$ is equal to 0 to 1, the amount of said crosslinking agent being in the range of 1 to 6 times the stoichiometric amount required to crosslink the polymeric material through the carbonyl groups.

12. A composition of matter useful in the production of crosslinked polyolefins consisting essentially of oxidized polyolefin containing carbonyl selected from the group consisting of aldehyde and ketone carbonyl and a crosslinking agent of the general formula: $Al(OR)_{3-y}Cl_y$ wherein OR is an alkoxy group containing 1 to 8 carbon atoms, and $y$ is equal to 0 to 1, the amount of said crosslinking agent being in the range of 1 to 6 times the stoichiometric amount required to crosslink the polyolefin through the carbonyl groups.

13. A composition of matter useful in the production of a crosslinked styrene-methyl vinyl ketone copolymer consisting essentially of styrene-methyl vinyl ketone copolymer and a crosslinking agent of the general formula: $Al(OR)_{3-y}Cl_y$ wherein OR is an alkoxy group containing 1 to 8 carbon atoms, and $y$ is equal to 0 to 1, the amount of said crosslinking agent being in the range of 1 to 6 times the stoichiometric amount required to crosslink the copolymer through the carbonyl groups.

14. The process according to claim 1 wherein the crosslinking agent is aluminum isopropoxide.

15. The composition according to claim 11 wherein the crosslinking agent is aluminum isopropoxide.

16. The composition according to claim 11 wherein the crosslinking agent is aluminum-n-butoxide.

17. The composition according to claim 11 wherein the crosslinking agent is chloroaluminum diisopropoxide.

References Cited by the Examiner

UNITED STATES PATENTS

| | | | |
|---|---|---|---|
| 2,628,214 | 2/53 | Pinkney et al. | 260—63 |
| 2,862,911 | 12/58 | Blanchette | 260—63 |
| 3,055,847 | 9/62 | Woods et al. | 260—2 X |

OTHER REFERENCES

Gal et al.: Hungarian Technical Abstracts, volume 8 (1956), Number 2, Number 41, page 44.

LEON J. BERCOVITZ, *Primary Examiner.*

UNITED STATES PATENT OFFICE
CERTIFICATE OF CORRECTION

Patent No. 3,175,996                          March 30, 1965

Razmic S. Gregorian et al.

It is hereby certified that error appears in the above numbered patent requiring correction and that the said Letters Patent should read as corrected below.

Column 5, line 60, for "10:5" read -- 1:0.5 --.

Signed and sealed this 17th day of August 1965.

(SEAL)
Attest:

ERNEST W. SWIDER                          EDWARD J. BRENNER
Attesting Officer                              Commissioner of Patents